United States Patent
Lovseth et al.

(10) Patent No.: US 11,614,532 B2
(45) Date of Patent: Mar. 28, 2023

(54) MULTISTATIC RADAR UTILIZING 5G

(71) Applicant: Rockwell Collins, Inc., Cedar Rapids, IA (US)

(72) Inventors: Jonathan A. Lovseth, Marion, IA (US); Sasha Oster, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 392 days.

(21) Appl. No.: 16/748,433

(22) Filed: Jan. 21, 2020

(65) Prior Publication Data

US 2021/0223381 A1  Jul. 22, 2021

(51) Int. Cl.
*G01S 13/46* (2006.01)
*H04W 4/029* (2018.01)
*G01S 13/58* (2006.01)
*H04W 16/28* (2009.01)

(52) U.S. Cl.
CPC ............ *G01S 13/46* (2013.01); *G01S 13/583* (2013.01); *H04W 4/029* (2018.02); *H04W 16/28* (2013.01)

(58) Field of Classification Search
CPC ....... G01S 13/46; G01S 13/583; H04W 4/029
See application file for complete search history.

(56) References Cited

U.S. PATENT DOCUMENTS

| | | |
|---|---|---|
| 2011/0217962 A1 | 9/2011 | Leung |
| 2017/0090025 A1 | 3/2017 | Wang |
| 2018/0180713 A1 | 6/2018 | Cohen et al. |
| 2018/0348340 A1* | 12/2018 | Lien ......................... G01S 13/34 |
| 2018/0348353 A1 | 12/2018 | Lien et al. |
| 2019/0265348 A1 | 8/2019 | Bengtsson et al. |
| 2019/0293748 A1* | 9/2019 | Gulati ................. H04W 74/004 |
| 2019/0369233 A1 | 12/2019 | Niesen et al. |

FOREIGN PATENT DOCUMENTS

| | | |
|---|---|---|
| IN | 201947036923 | 10/2019 |
| IN | 201947037204 | 10/2019 |
| WO | 2019053711 A1 | 3/2019 |

OTHER PUBLICATIONS

"Should Radar Be Improved Under 5G?", Radar, 5G, Aviation, Aviation Technology, Aviation Safety, May 16, 2019, https://www.rebellionresearch.com/blog/should-radar-be-improved-under-5g, 3 pages.
Extended Search Report for European Application No. 21152575.3 dated Jun. 18, 2021, 11 pages.

* cited by examiner

*Primary Examiner* — Vladimir Magloire
*Assistant Examiner* — Artem Melkunov
(74) *Attorney, Agent, or Firm* — Suiter Swantz pc llo (57) ABSTRACT

A multi node radar network system is disclosed. The system includes a base node configured to transmit a directional 5G RF signal, a request node configured to request the base node to transmit the 5G RF signal, and one or more listening nodes configured to receive reflections of the 5G RF signal off of a target object. The system further includes a computation module configured to determine the location of the target object from data received from at least one of the base node, the request node, or the one or more listening nodes. A method for determining the position of a target object in a multi node radar system is disclosed.

13 Claims, 8 Drawing Sheets

MULTISTATIC RADAR UTILIZING 5G

BACKGROUND

Traditional "monostatic" radar systems utilize a single transmitter/receiver paired unit wherein a transmitter element transmits a radio wave toward a target object of interest. Waves reflecting off of the target object are received by the receiver element. The detection of the reflected waves is used to determine distance, velocity, and other characteristics of the target object. Multistatic radar systems include multiple transmitters and receivers that are spatially separated. These systems are configured to view target objects from different locations and angles and compile data from the different receiving sites, potentially giving the user a more robust representation of the target object than can be accomplished using monostatic radar systems.

Multistatic radar systems often use fixed-site or vehicle-mounted transmitters that concentrate RF power in a given direction through phased area beam-steering, or by mechanically-steering a transmission dish. These signals may be received by passive receivers that may be quite large and unwieldy (e.g., some vehicle-based systems weigh over 2000 kg). Multistatic radar systems may also require communication network environments that can handle considerable computation needs under low latency conditions, which may be a difficult task in the field. Therefore, it would be advantageous to provide a solution that cures the shortcomings described above.

SUMMARY

A multi node radar network system is disclosed. In one or more embodiments, the multi node radar network system includes a base node. In some embodiments, the base node includes a first transmitter. The first transmitter is configured to transmit a directional 5th generation (5G) radio frequency (RF) signal. In some embodiments, the base node further includes a first receiver. The first receiver is configured to receive one or more communications from the multi node radar network. In some embodiments, the base node further includes a controller being in communication with the multi node radar network. The controller is configured to receive the one or more communications from the first receiver. The controller is further configured to command the first transmitter to transmit a 5G RF signal based on the one or more communications from the first receiver. The controller is further configured to command the first transmitter to steer the 5G RF signal based on the one or more communications from the first receiver. In some embodiments, the multi node radar network system further includes a request node. In some embodiments, the request node includes a second transmitter. The second transmitter is configured to transmit to the base node a first request to transmit the 5G RF signal. The second transmitter is further configured to transmit to the base node a second request to steer the 5G RF signal in a requested direction. In some embodiments, the request node further includes a second receiver. The second receiver in configured to receive the 5G RF signal from the base node. The second receiver is further configured to receive data from the one or nodes within the multi node radar network system. In some embodiments, the multi node radar network system further includes one or more listening nodes. The one or more listening nodes includes a third receiver. The third receiver is configured to receive a reflection of the 5G RF signal off of at least one of a target object or nontarget object. The third receiver is further configured to receive data from one or more nodes within the multi node radar network system. The listening node further includes a third transmitter. The third transmitter is configured to send data to the one or more nodes within the multi node radar network system. In some embodiments, the multi node radar network system further includes a computation module. The computation module is configured to receive data from at least one of the base node, the request node, or the one or more listening nodes. The computation module is further configured to calculate a position of the target object. The computation module is further configured to report the position of the target object to at least one of the base node, the request node, or the one or more listening nodes.

In some embodiments of the system, the base node further includes a consumer wireless base station.

In some embodiments of the system, at least one of the base node, the request node, or the one or more listening nodes further comprises a mobile electronic device.

In some embodiments of the system, the computation module further comprises a non-transitory computer-readable storage medium encoded with processor-executable instructions.

In some embodiments of the system, the computation module at least partially comprises a cloud computing resource.

In some embodiments of the system, the base node is synchronized with the request node and at least one listening node.

In some embodiments of the system, the position of at least one of the base node, the requesting node or the one or more listening nodes are determined by at least one of a global positioning method, or by sending and receiving signals between the one or more nodes.

A method for determining the position of a target object in a multi node radar network system is also disclosed. In one or more embodiments, the method includes preparing a base node to transmit a 5th generation (5G) radio frequency (RF) signal. In some embodiments, the method further includes sending a signal from a request node to the base node requesting a transmission of the 5G RF signal in the desired direction. In some embodiments, the method further includes transmitting the 5G RF signal via the base node. In some embodiments, the method further includes receiving reflections of the 5G RF signal off of at least one of a target object or non-target object via at least one of the base node, or one or more listening nodes. In some embodiments, the method further includes sending data from at least one of the base node, the requesting node, or one or more listening nodes to a computation module. In some embodiments, the method further includes calculating the position of the target object via the computation module. In some embodiments, the method further includes transmitting positional data of the target object via the computation module to at least one of the base node, the requesting node, or the one or more listening nodes.

In some embodiments of the method, the base node further includes a consumer wireless base station.

In some embodiments of the method, at least one of the base node, the request node or the one or more listening nodes further includes a mobile electronic device.

In some embodiments of the method, the computation module further includes a non-transitory computer-readable storage medium encoded with processor-executable instructions.

In some embodiments of the method, the request node is further configured to control a beam direction of the base node using a 5G communication data request.

In some embodiments of the method, the computation module at least partially includes a cloud computing resource.

In some embodiments of the method, the base node is synchronized with the request node and at least one listening node.

In some embodiments of the method, the positional data of at least one of the base node, the request node or the one or more listening nodes are reported to the computation module.

In some embodiments of the method, the position of at least one of the base node, the request node or the one or more listening nodes are determined by at least one of a global positioning method, or by sending and receiving signals between one or more nodes.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Multistatic radar, also referred to as "multisite radar", "netted radar, or "multi node radar" is a radar system that uses multiple transmitters and receivers to sample an area larger than what can be typically covered by a single monostatic radar system. Multistatic radar systems are often comprised of multiple monostatic and bistatic radar systems working in a network. These components work to spread the radar geometry throughout the area to be searched and reduces the average distance of a targeted object to a transmitter/receiver pair, resulting in a higher signal to noise (e.g., SNR) ratio.

Currently, surveillance systems use multistatic radar to track both enemy and friendly targets in the field. These systems use one or more spatially diverse transmitter/receiver pairs, where each transmitter sends a high-powered signal. Receivers receive any signal that reflects off of the targeted object. By tracking send and receive times, receivers can use a single transmitter to calculate a distance between the transmitter and the target object. Doppler frequency shift can be used to determine the velocity of the target object.

Multistatic radars may also include unpaired transmitters and receivers. For example, a transmitter may transmit a signal to a target object, which may reflect a signal towards a spatially isolated receiver that is a known distance from the transmitter and is synchronized with the transmitter. Here, through the reporting of the time that the receiver received the reflected waves from the target object, and the angle formed from the beam sent from the transmitter to the target object, the location of the target object may be determined.

The use of high-powered radio signals for multistatic radar often requires the use of heavy equipment. For example, a transmitter for a multistatic radar system in the field may require a vehicle to transport both the transmitter and the power supply for the transmitter, weighing in at several thousand kilograms. The dedication of large vehicles for radar systems is often unwieldy in the field.

Fifth generation (5G) cellular systems are quickly developing among developed countries. 5G systems use frequencies in both the 600 MHz to 6 GHz range and 24 GHz to 86 GHz range (e.g., millimeter wave). This range of frequencies are already used by several radar systems. For example, the Medium Extended Air Defense System (MEADS) utilizes frequencies in the 300 MHz to 1 GHz range. In another example, many surface-movement radars (e.g., radar used to scan airports surfaces during inclement weather) operate in the K-band (e.g., 20 to 40 GHz). The development of 5G consumer base stations and mobile handsets that communicate through the use of these base stations suggest that a multistatic radar network system could be formed using off-the-shelf componentry from commercially available 5G communication systems.

Figure 1:
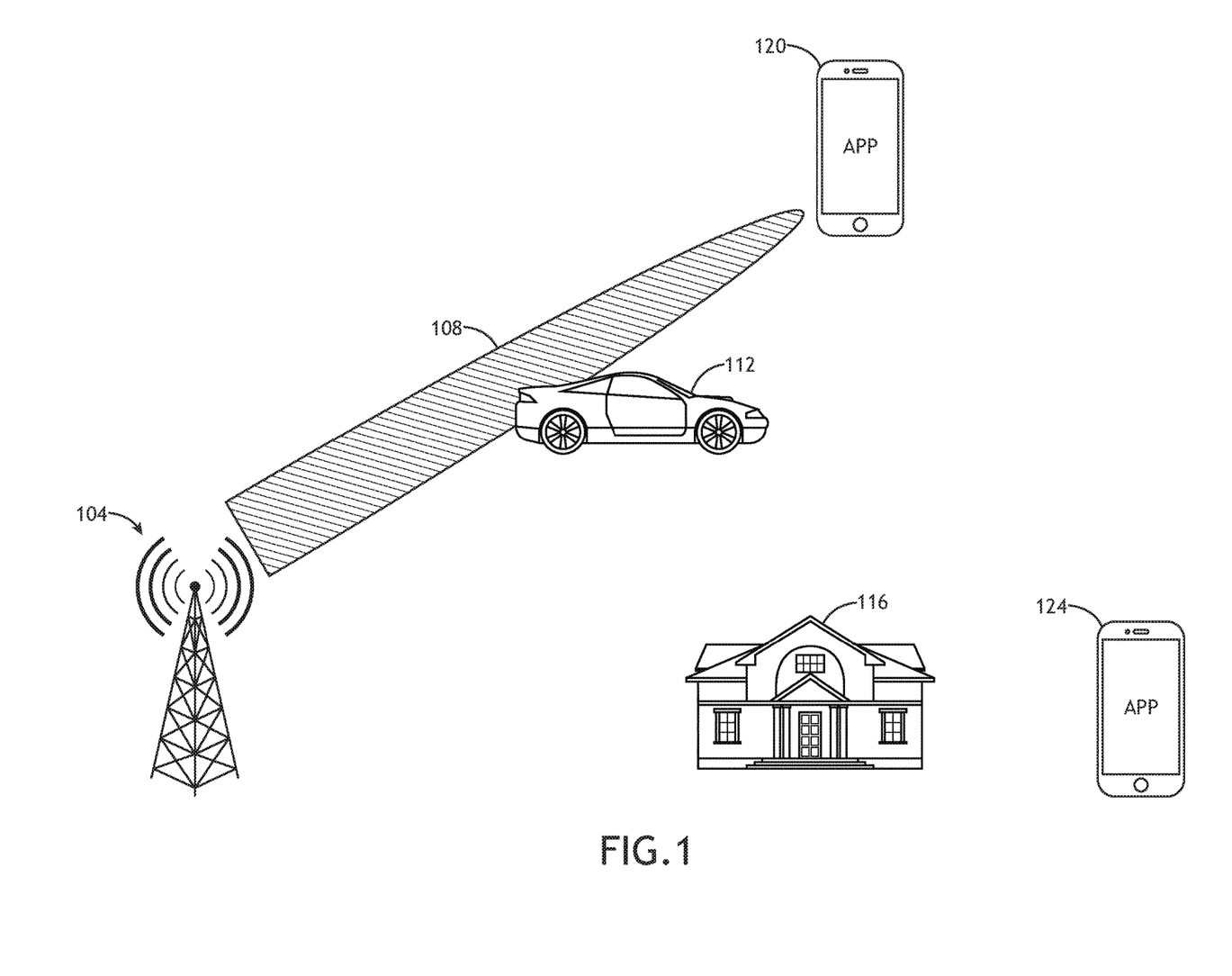
FIG. 1 is a diagram illustrating a multi node radar network system, in accordance with one or more embodiments of the present disclosure.

FIG. 1 is a diagram illustrating a multi node radar network system 100, in accordance with one or more embodiments of the present disclosure. In some embodiments, the multi node radar network system 100 includes a base node. The base node 104 is configured to transmit a strong directional 5G RF signal 108. In some embodiments, the base node 104 is a fixed-site node. For example, the base node 104 may be a permanently affixed at a cell-phone tower. In some embodiments, the base node 104 is a mobile node. For example, the base node 104 may be contained within a military vehicle that can be transported to a surveillance zone. In another example, the base node 104 may be a transceiver configured to be carried by one person.

In embodiments, the base node 104 is configured to transmit a 5G RF signal powerful enough that the reflection of a portion of the 5G RF signal off of a target object or non-target object may be received by other node and used to calculate a position of the target object or non-target object. In some embodiments, the base node includes a first transmitter In some embodiments, the first transmitter of the base node 104 may be configured to transmit a signal of +75 dBm. In some embodiments, the first transmitter of the base node 104 may be configured to transmit a signal less than +75 dBm. For example, the first transmitter may be configured to transmit a signal in a range of +15 dBm to +74 dBm. In another example, the first transmitter may be configured to transmit a signal greater than +75 dBm. For instance, the first transmitter may be configured to transmit a signal in a range of +76 dBm to +100 dBm. Many ranges of power of the first transmitter of the base node 104 are possible, therefore the above description should not be interpreted as a limitation of the present disclosure, but merely an illustration.

In some embodiments, the multi node radar network system 100 includes a request node 120. The request node 120 communicates with the base node 104 that a 5G RF signal 108 from the base node 104 be transmitted in the direction of the request node. For example, if the request node 120 needs to track a target object 112 (e.g., an unmanned aircraft) flying near the line of sight (LOS) of the request node 120 to the base node, the request node 120 will send a signal to the base-node requesting high data, consequently the 104 base node will send a 5G RF signal 108 be in the direction of the request node. When the base node 104 sends the 5G RF signal 108, the request node 120 will listen for any portions of the 5G RF signal 108 that are not reflected away from the request node by the target object. Data that the request node receives from the 5G RF signal may be shared with other nodes in order to calculate timing of reflections and thereby the position of the target object 112. In some embodiments, the request node 120 is a mobile device capable of receiving and transmitting a 5G signal (e.g., smartphone, tablet, notebook computer, wearable device, media player, or the like).

In some embodiments, the multi node radar network system 100 includes one or more listening nodes 124. The listening node 124 listens for reflections of the base node 104 transmitted 5G RF signal 108 that have been reflected of the target object 112 or nontarget object 116. Data that the listening node 124 receives from the 5G RF signal may be shared with other nodes in order to calculate the position of the target object 112. In some embodiments, the listening node 124 is a mobile device capable of receiving and transmitting a 5G signal (e.g., smartphone, tablet, notebook computer, wearable device, media player, or the like).

Figure 2:
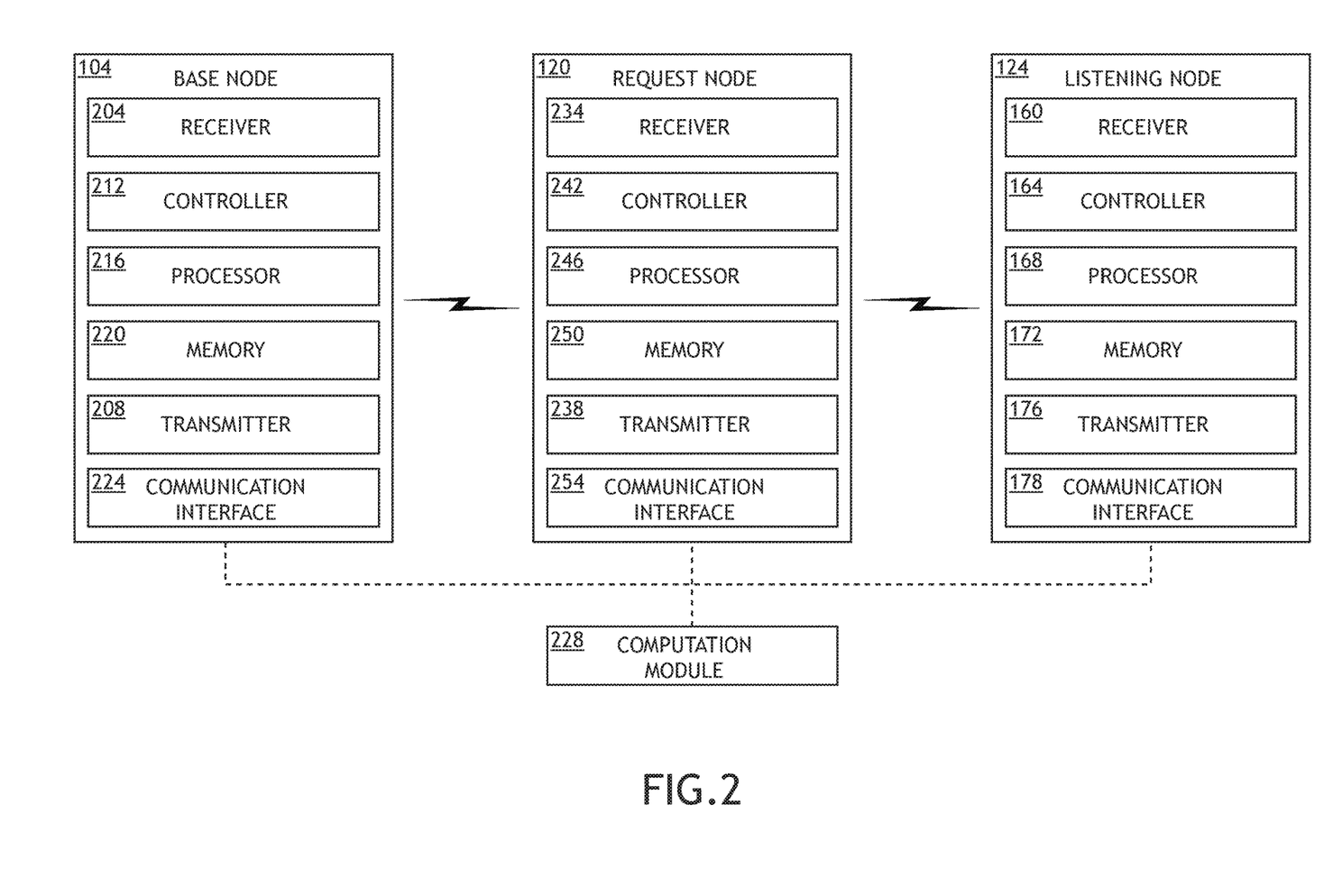
FIG. 2 is a block diagram illustrating individual components of the multi node radar network system, in accordance with one or more embodiments of the present disclosure.

FIG. 2 is a block diagram illustrating individual components of the multi node radar network system 100, in accordance with one or more embodiments of the present disclosure. In some embodiments, the base node 104 includes a first receiver 204. The first receiver 204 is configured to configured to receive one or more communications from the multi node radar network system 100. For example, in some embodiments, the first receiver 204 is configured to receive a first signal (e.g., a first request) from the request node 120 requesting that the base node 104 transmit a 5G RF signal. In another example, the first receiver 204 is configured to receive a signal (e.g., a second request) from the request node 120 requesting that the case node steer the 5G RF signal in the direction of the request node 120. In another example, the first receiver 204 may receive a signal from the request node 120 confirming that the request node 120 has received the 5G RF signal from the base node 104 and/or data related to the received signal (e.g., timing or intensity data). In another example, the receiver 204 may receive from one or more listening nodes 124 data that the one or more listening nodes 124 have received from the 5G RF signal 108 reflecting off of a target object 112 or nontarget object 116. In another instance, the receiver 204 may receive a communication from the one or more listening nodes 124 that no reflection signals were received.

The first receiver 204 for the base node 104 may be any type of receiver or transceiver known to receive RF signals. For example, the first receiver 204 for the base node 104 may be a stand-alone receiver with one or more antennas. In another example, the first receiver 204 may be a multichannel receiver capable of receiving multiple time and/or frequency diverse signals. In another example, the first receiver 204 may be an integrated component of a radar system (e.g., a bistatic radar passive receiver system or a bistatic weather radar system). In another example, the first receiver 204 may be an integrated component of a mobile device including, but not limited to, a smartphone, tablet, notebook computer, wearable device, or media player.

In some embodiments, the base node 104 includes a first transmitter 208. The first transmitter 208 of the base node 104 is configured to transmit a millimeter 5G RF signal 108 with primary communication data, but that can also be used to detect and locate a target object 112. The first transmitter 208 may be of any type of transmitter 208 capable of transmitting a 5G RF signal 108 for use in a multi node radar network system 100. For example, the first transmitter 208 may be a transmitting component of a 5G consumer wireless base station. In another example, the first transmitter 208 may be a 5G wireless base station configured to transmit a 5G RF signals greater than +50 dBm. It should be noted that the first transmitter 208 may be configured to transmit data to one or more nodes separate from the 5G RF signal 108 requested by the request node. For example, the first transmitter 208 of the base node 104 may send data to other nodes using a typical signal received by a mobile phone.

In some embodiments, the first transmitter 208 for the base node 104 is capable of focusing the beam to a requested position. For example, the first transmitter 208 may be a configured to be capable of physical movement (e.g., rotated) so that the path of the 5G RF signal 108 is transmitted in the requested direction. For instance, the first transmitter 208 may be capable of rotating along an elevation axis to transmit the 5G RF signal 108 in the requested direction. In another instance, the first transmitter may be configured to rotate along an azimuthal axis to transmit the 5G RF signal 108 in the requested direction. In another instance, the transmitter 208 may be configured to rotate along both a vertical and horizontal axis to transmit the 5G RF signal 108 the requested direction. In some embodiments, the first transmitter 208 of the base node 104 is a phased array antenna (e.g., an active electronically scanned array (AESA)) capable of electronically steering the 5G HR signal to point in different directions without physically moving the antenna. For example, the phased array antenna may include a 32-element (e.g., eight by four) array. For instance, the 32-element phased array antenna may provide a 15° beam. In some embodiments, the base node 104 further includes a controller 212, processor 216, memory 220 and a communication interface 224.

The controller 212 provides processing functionality for the base station 103 and can include any number of processors 216. The processors 216 may include any type of processing elements, including but not limited to integrated circuits (e.g., application specific integrated circuits (ASIC) and field programmable gate arrays (FPGA). The controller may also include resident or external memory 220 for storing data, executional code, and other resident or external memory 220 generated by the multi node radar network system 100. The controller 212 can execute one or more software programs embodies in a non-transitory computer readable medium (e.g., memory 220) that implement techniques described herein. In some embodiments, the controller is not limited by the materials from which it is formed or the processing mechanisms employed therein and, as such, can be implemented via semiconductor(s) and/or transistors (e.g., using electronic integrated circuit (IC) components), and so forth.

The memory 220 can be an example of tangible, computer-readable storage medium that provides storage functionality to store various data and/or program code associated with operation of the multi node radar network system 100 and/or controller 212, such as software programs and/or code segments, or other data to instruct the controller 212, and possibly other components of the multi node network system 100, to perform the functionality described herein. Thus, the memory 220 can store data, such as a program of instructions for operating the controller, the base node 104 and its components. It should be noted that while a single memory 220 is described, a wide variety of types of combinations of memory (e.g., tangible, non-transitory memory) may be employed. The memory can be integral with the controller 206, can comprise stand-alone memory, or can be a combination of both. Some examples of the memory 220 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 224 can be operatively configured to communicate with the computation module 228. For example, the communication interface 224 can be configured to retrieve data from the controller 212 or other devices (e.g., the transmitter 208, the base node, and/or other components of the multi node radar network system 100), transmit data for storage in the memory 220, retrieve data from storage in the memory 220, and so forth. The communication interface 224 can also be communicatively coupled with the controller to facilitate data transfer between components of the multi node radar network system 100 and the controller 212.

It should be noted that while the communication interface 224 is described as a component of the base node 104, one or more components of the communication interface 224 may be implemented as external components communicatively coupled to the base node 104 via a wired and/or wireless connection. In embodiments, the communication interface 224 is coupled to a transmitter 208, receiver 204 transceiver, physical connection device, or any combination thereof.

In some embodiments, the multi node radar network system 100 further includes a computation module 228. The computation module calculates the location of the target object 112 and/or the non-target object 116 from data received from at least one of the base node, the request node 120, or one or more of the listening nodes 124. The computation module 228 may be configured as a software program residing on one or more nodes (e.g., the base node 104 the request node 120, or one or more listening nodes 124). For example, the computation module 228 may exist as a software program stored in the memory 220 of the base node, and executed on processors 216 of the controller 212. In another embodiment, the computation module may exist as a software program stored in memory 250 of the request node, and executed on processors 246 of the controller 242. In a further embodiment, the computation module may exist as a software program stored in memory 280 of the listening node, and executed on processors 276 of the controller 272. The computation module 228 may then receive data from other nodes. For example, the computation module 228 may receive data from the base station on the timing and direction of the 5G RF signal 108 that is intended to be used as a radar detection signal. In another example, the computation module 228 may receive data from the request node 120 detailing when the 5G RF signal 108 received the 5G signal 108. In another example, the computation module 228 may receive data from one or more listening nodes detailing the position of the listening node and the time that the listening node received the reflected 5G RF signal 108. It should be noted that the computation module 228 may exist on the base node 104, the request node 120, or the one or more listening nodes 124, or a combination of the nodes. For example, all nodes may utilize the computation module 228, as a software program (e.g., an 'app') that is loaded on every node, with every node communicating the data relevant to the 5G RF signal 108 and the reflection of the 5G RF 108 signal.

In some embodiments, the computation module 228 is a remote server (e.g., a cloud-based server or other cloud computing resource). For example, one or more nodes may upload the data from the 5G RF signal (e.g., send time, receive time, and/or node position) to a remote server. Software residing on the remote server received the input from the multiple nodes, calculates the position and/or velocity of the target object 112, and sends the data regarding the position and/or velocity of the target object 112 to the one or more nodes (e.g., the base node 104, the request node 120, and/or the one or more request nodes 124.

In some embodiments, the request node 120 further includes a second receiver 234. The second receiver 234 is capable of receiving the 5G RF signal 108 transmitted by the base node 104. In some embodiments, the request node 120 further includes a second transmitter 238. The second transmitter 238 is configured to transmit a signal to the base node 104 requesting that a 5G RF signal 108 be sent in the direction of the request node 120. The second transmitter 238 is also configured to transmit a data signal to other the one or more listening nodes 124, the base node 104, and/or the computation module 228 containing information relevant to the location and/or velocity of the target object 112. The request node 120 further includes a controller 242, one or more processors 246, memory 250 and a communication interface 254, performing duties analogous to similar elements within the base node 104 and/or listening node 124. In some embodiments, the second receiver 234, second transmitter 238, controller 242, one or more processors 246, memory 250, and communication interface 254 are integrated into a single device (e.g., smartphone, tablet, notebook computer, wearable device, media player, or the like).

In some requirements, the one or more listening nodes 124 includes a third receiver. The third receiver 264 is capable of receiving a 5G RF signal 108 that has reflected off of a target object 112 or nontarget object 116. In some embodiments, the listening node 124 further includes a third transmitter 268. The third transmitter 268 is configured to transmit a signal to one or more nodes (e.g., the base node 104, the request node 120, or another of the one or more listening nodes 124) and/or the computation module 228 containing information relevant to the location and/or velocity of the target object 112. The one or more listening nodes 124 further includes a controller 272, one or more processors 276, memory 280, and a communication interface 284, performing duties analogous to similar elements within the base node 104 or request node 120. In some embodiments, the receiver 264, transmitter 268, controller 272, on or more processors 276, memory 280, and communication interface 284 are integrated into a single device (e.g., smartphone, tablet, notebook computer, wearable device, media player, or the like).

It should be noted that a node acting as a listening node 124 in a first instance may act as a request node in the second instance, and vice-versa. For example, as shown in FIG. 1, a target object 112 such as an automobile may initially cause the request node 120 to transmit a request to the base node 104 to transmit a 5G RF signal 108, upon which a reflection of the 5G RF signal 108 is detected by the listening node 124, and the position and velocity of the automobile is determined. The automobile may then move from the line of sight between the original request node 120 and the base node 104 to a position between the listening node 124 and base node 104. At this instance, the original listening node 124 will assume the role of the request node 120 and the original request node 124 will assume the role of the listening node, and a new iteration of determining the location and/or the velocity of the automobile will initiate. Nodes may coordinate timing to interleave signals from nodes acting as request node 120 or listening nodes 124.

Figure 3:
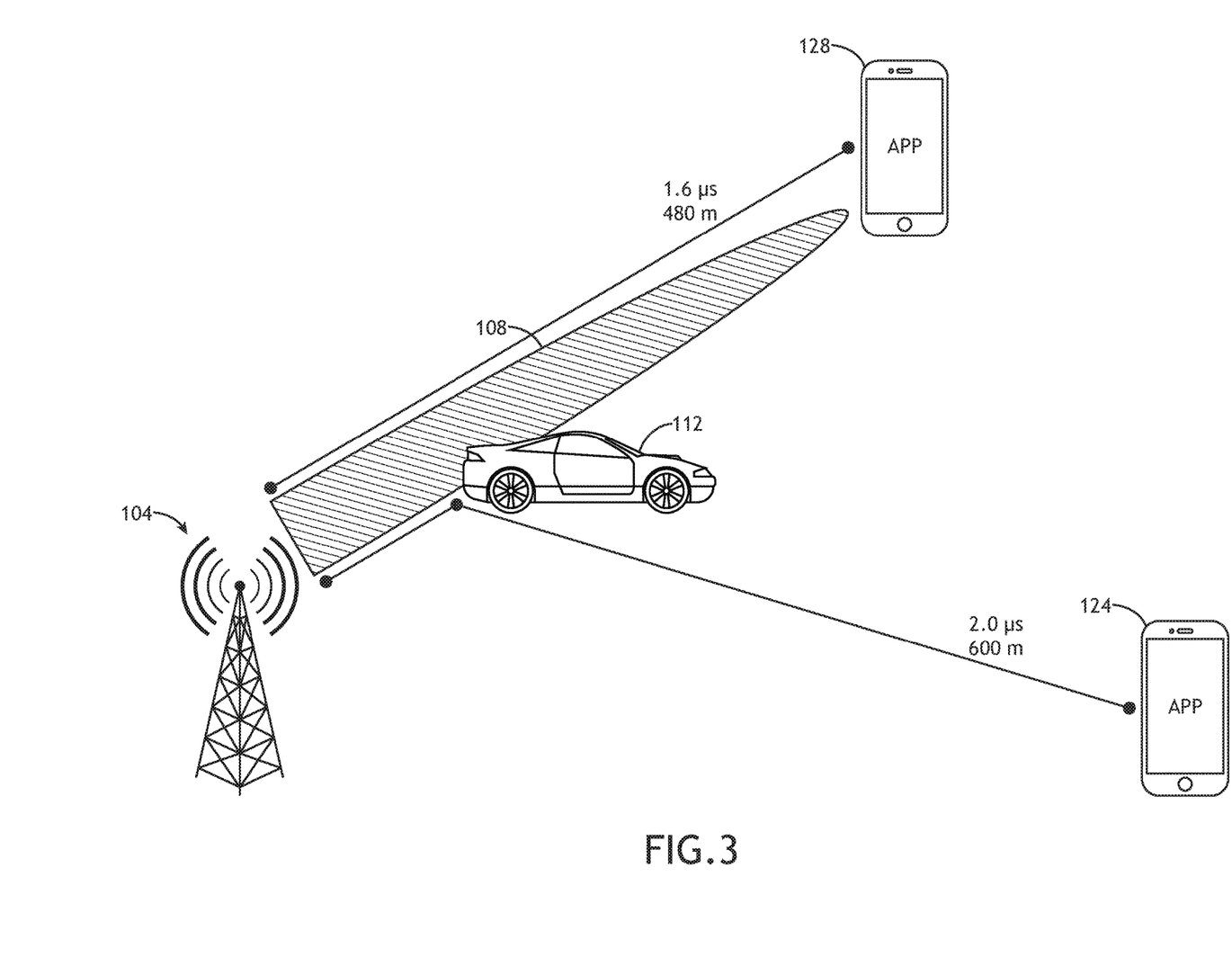
FIG. 3 is a diagram illustrating the calculation of the position of a target object using the multi node radar network system, in accordance with one or more embodiments of the present disclosure.

FIG. 3 is a diagram illustrating the calculation of the position of a target object 112 using the multi node radar network system 100, in accordance with one or more embodiments of the present disclosure. In this example, the request node 120 initiates the location process by transmitting to the base node 104 a request to transmit 5G RF signal 108 back to the request node 120. The base node 104 then transmits a 5G RF signal 108 in the direction of the request node 120. Because all nodes within the multi node radar network system 100 are synchronized when they are communicating with each other, the request node 120 knows when the transmission of the 5G RF signal is initiated. When portion of the 5G RF signal 108 reaches the request node in 1.6 psecs, the request node calculates that the request node is approximately 480 meters from the relay node (e.g., using the formula $c_0*t$). At the same time, the listening node 124 receives a portion of the 5G RF signal 108 that has reflected off of the target object 112. In this example, the listening node determines that the 5G RF signal has taken 0.4 psecs longer to reach the listening node 124 than the request node 120, The listening node 124 can also determine the direction of the reflected beam (e.g., by the nodes calculating and reporting node location within the network). Because the relative position of all three nodes are known, the reflection angle of the reflected 5G RF signal can be calculated by the computation module 228 as well as the position of the target object 112. By making multiple calculations of the position of the target object 112 over time, a velocity of the target object 112 may also be calculated.

Figure 4:
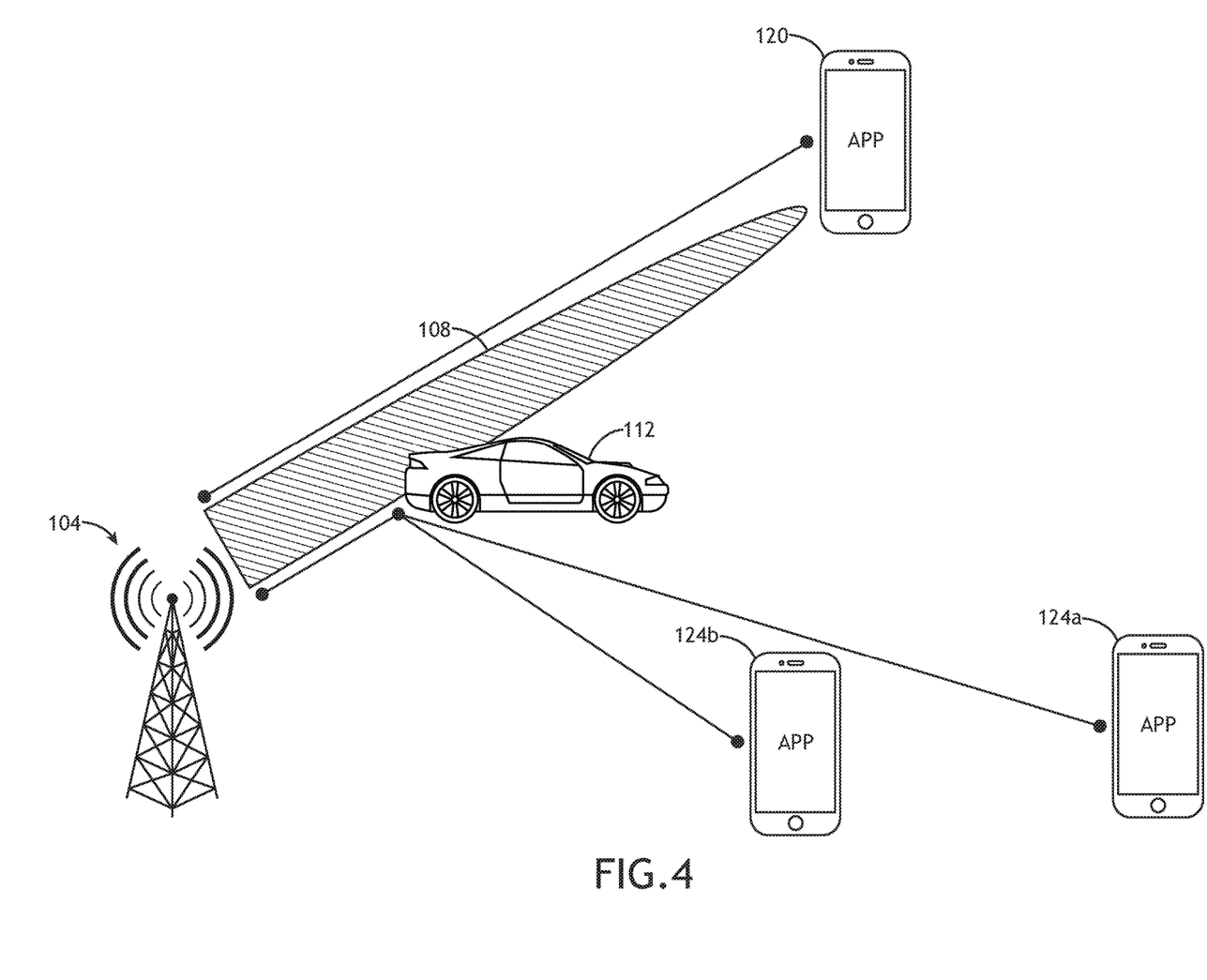
FIG. 4 is a diagram illustrating the calculation of a position of a target object using more than one listening node within the multi node radar network system, in accordance with one or more embodiments of the present disclosure.

FIG. 4 is a diagram illustrating the calculation of a position of a target object using more than one listening node 124 within the multi node radar network system 100, in accordance with one or more embodiments of the present disclosure. As in the previous example, the request node 120 initiates the process by transmitting to the base node 104 a request to transmit a 5G RF signal 108 back to the request node 120. The base node 104 transmits the 5G RF signal 108, resulting in two listening nodes 124a,b receiving a portion of the reflected 5G RF signal 108, as well as the request node receiving a non-reflective 5G RF signal 108. All nodes receiving signals share their respective reception time for the signal as well as the relative position of each node. The computation module 228 then uses the data to calculate the position of the target object 112 and report the position of the target object to at least one of the nodes.

Figure 5:
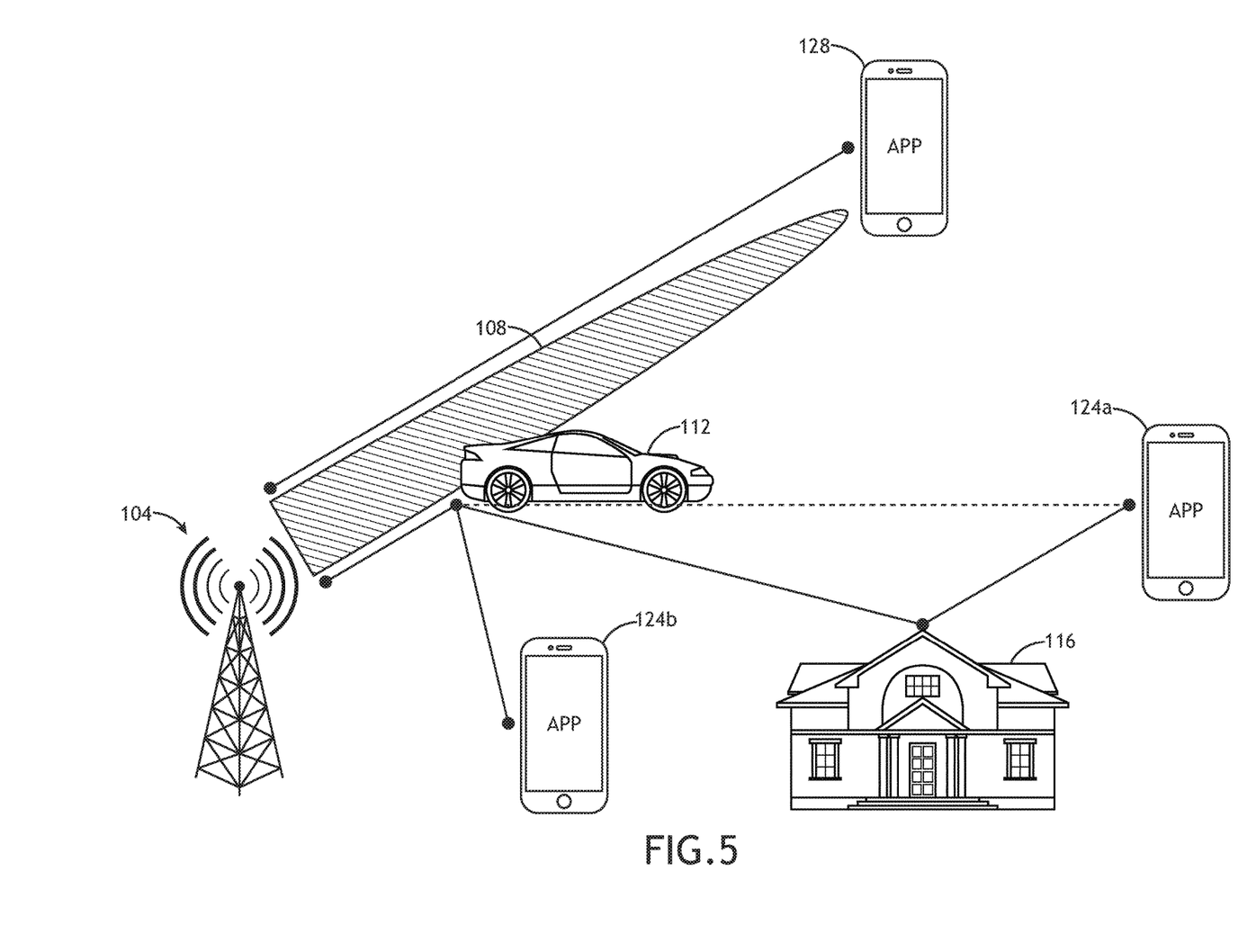
FIG. 5 is a diagram illustrating the calculation of a position of a target object using more than one listening node, wherein one listening node is inaccurate, in accordance with one or more embodiments of the present disclosure.

The use of multiple listening nodes 124 may increase the accuracy of the location of the target object 112 as well as determine whether the reading of one or more listening nodes 124 is inaccurate. FIG. 5 is a diagram illustrating the calculation of a position of a target object 112 using more than one listening node 124a,b, wherein one listening node 124a is inaccurate, in accordance with one or more embodiments of the present disclosure. As in the previous example, two listening nodes 124a,b have received reflections of a 5G RF signal 108 off of a target object 112 that was transmitted from a base node 104. One of the listening nodes 124a has received a signal that has reflected off twice, once off of the target object 112, and once off of a nontarget object 116 (e.g., a house). The double reflection of the 5G RF signal 108 increases the time that the signal reaches the listening node 124 as well as alters the direction of the signal, misleading the listening node 124a and potentially the multi node radar network system 100 that the target object is further away from the listening node 124 and aligned in a different direction. When both listening nodes 124 report their data to the computation module 228, the discrepancy between the two listening nodes 124a,b will be noted. Through further measurements and/or the addition of another listening node, the discrepancy will be resolved and the true location of the target object 112 will be known.

Figure 6A:
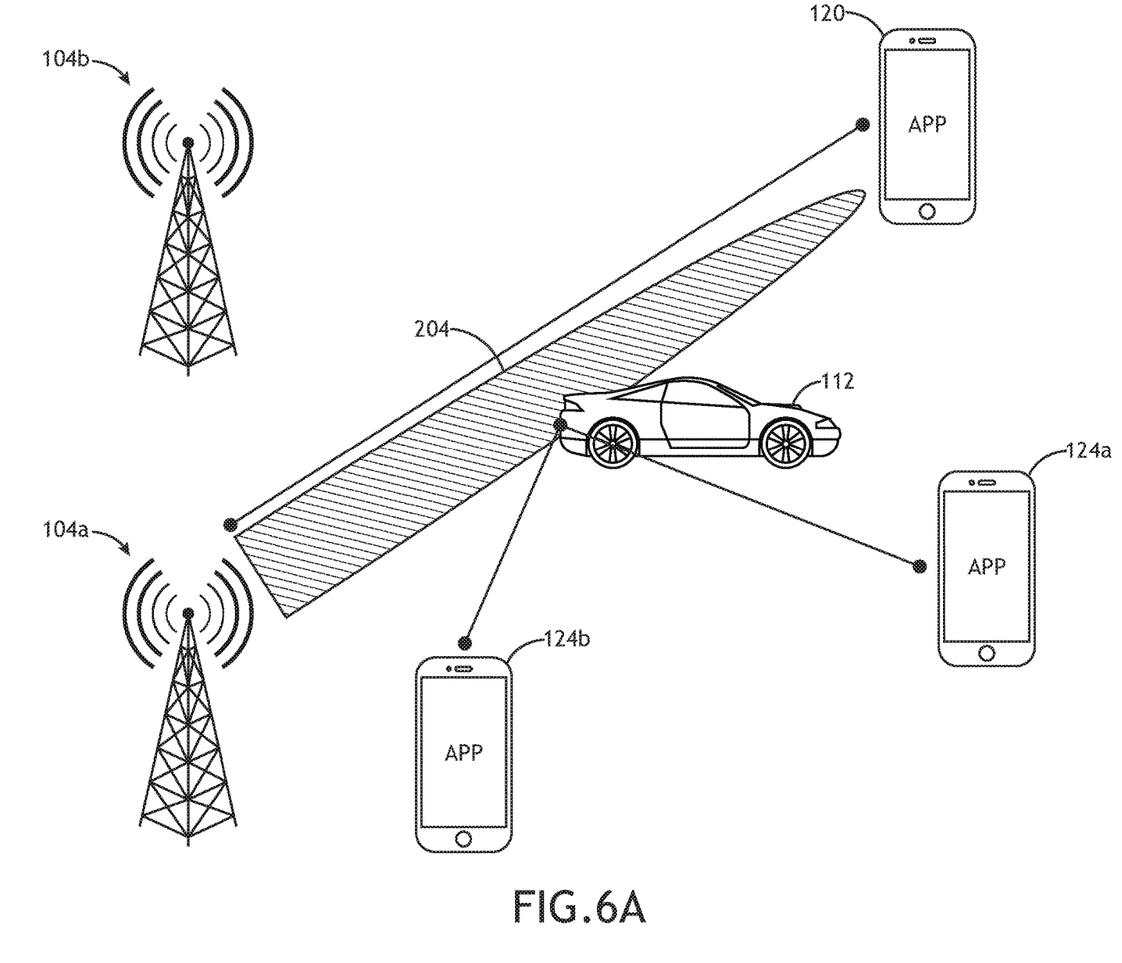
FIG. 6A is a diagram illustrating the calculation of a position of a target using more than one base node, in accordance with one or more embodiments of the present disclosure.
Figure 6B:
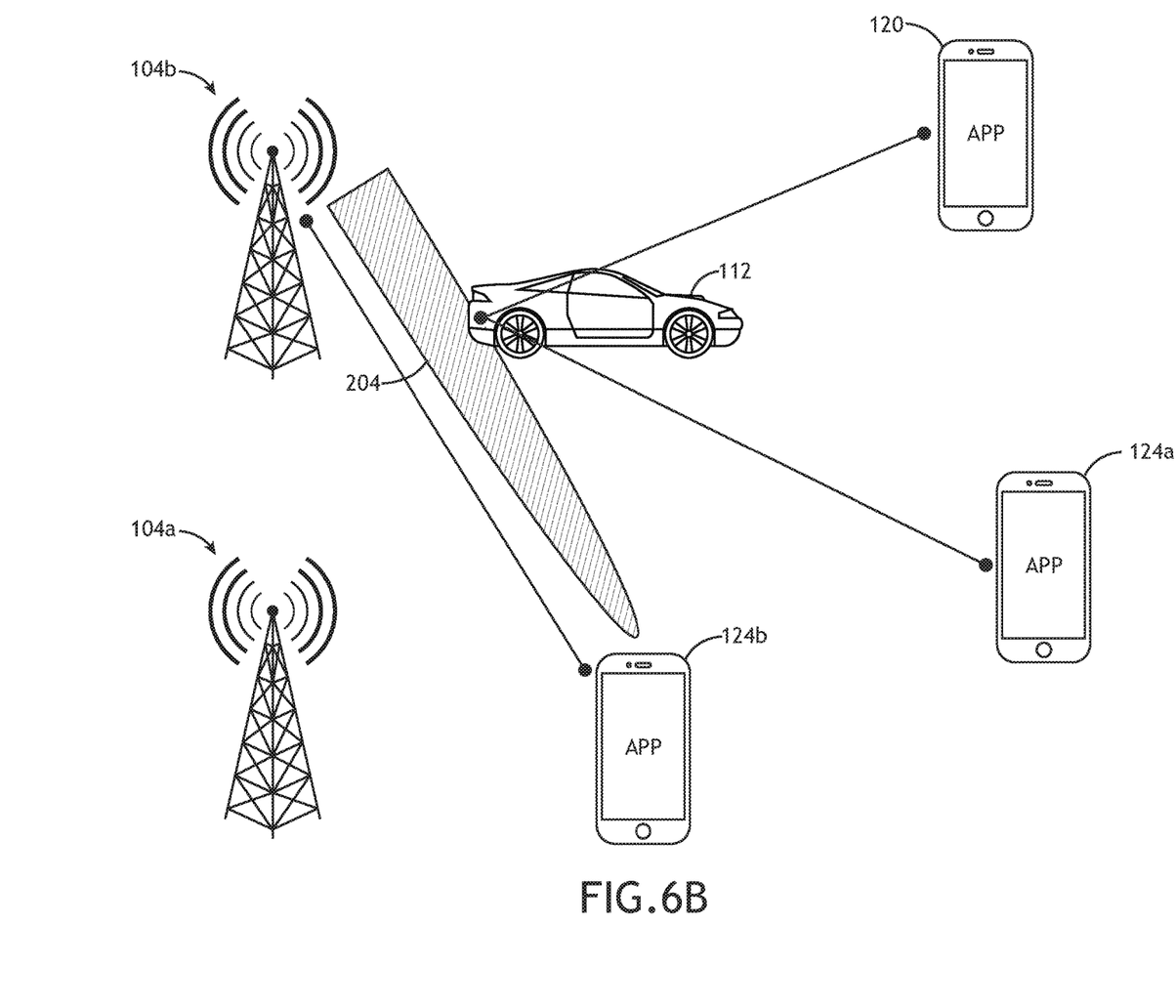
FIG. 6B is a diagram illustrating the calculation of a position of a target using more than one base node, in accordance with one or more embodiments of the present disclosure.

Multiple base nodes 104a,b may be used within the multi node radar network system 100 to provide better coverage and more radar interrogation angles. FIGS. 6A and 6B are diagrams illustrating the calculation of a position of a target object 112 using more than one base node 104a,b, in accordance with one or more embodiments of the present disclosure. In one example, referring to FIG. 6A, the target object 112 within the multimode radar network system 100 may be aligned in a position between the base node 104A and the request node 120. A base node 104a sending a 5G RF signal 108 toward the request node 120 would then result in a reflected signal that received by listening nodes 124a,b. The data received by the request node 120 and receiving nodes 124a,b, would then be used to calculate the position of the target object 112. In another example, referring to FIG. 6B, the target object 112 within the multi node radar network system 100 may not be aligned in a position between the base node 104a and the request node 120 (e.g., FIG. 6B is not drawn to scale). A base node 104a sending a 5G RF signal 108 towards the request node 120 would then result in a non-reflected signal that would not be positively informative on the location of the target object 112. Other request nodes 120 (e.g., listening nodes 124a,b, that are now configured to request a 5G RF signal) may similarly not be successful in requesting a 5G RF signal 108 from the base node 104a that can be successfully reflected to listening nodes 124. However, an alternative base node 104b within the multi node radar network system 100 may align with both the target object 112 and one of the other nodes 124b, allowing a 5G RF signal to be requested by the request node (e.g., listening node 124b now acting as a request node) that is reflected to one or more listening nodes (e.g., listening node 124a and request node 120 now acting as a listening node), and the position of the target object may then be elucidated.

Figure 7:
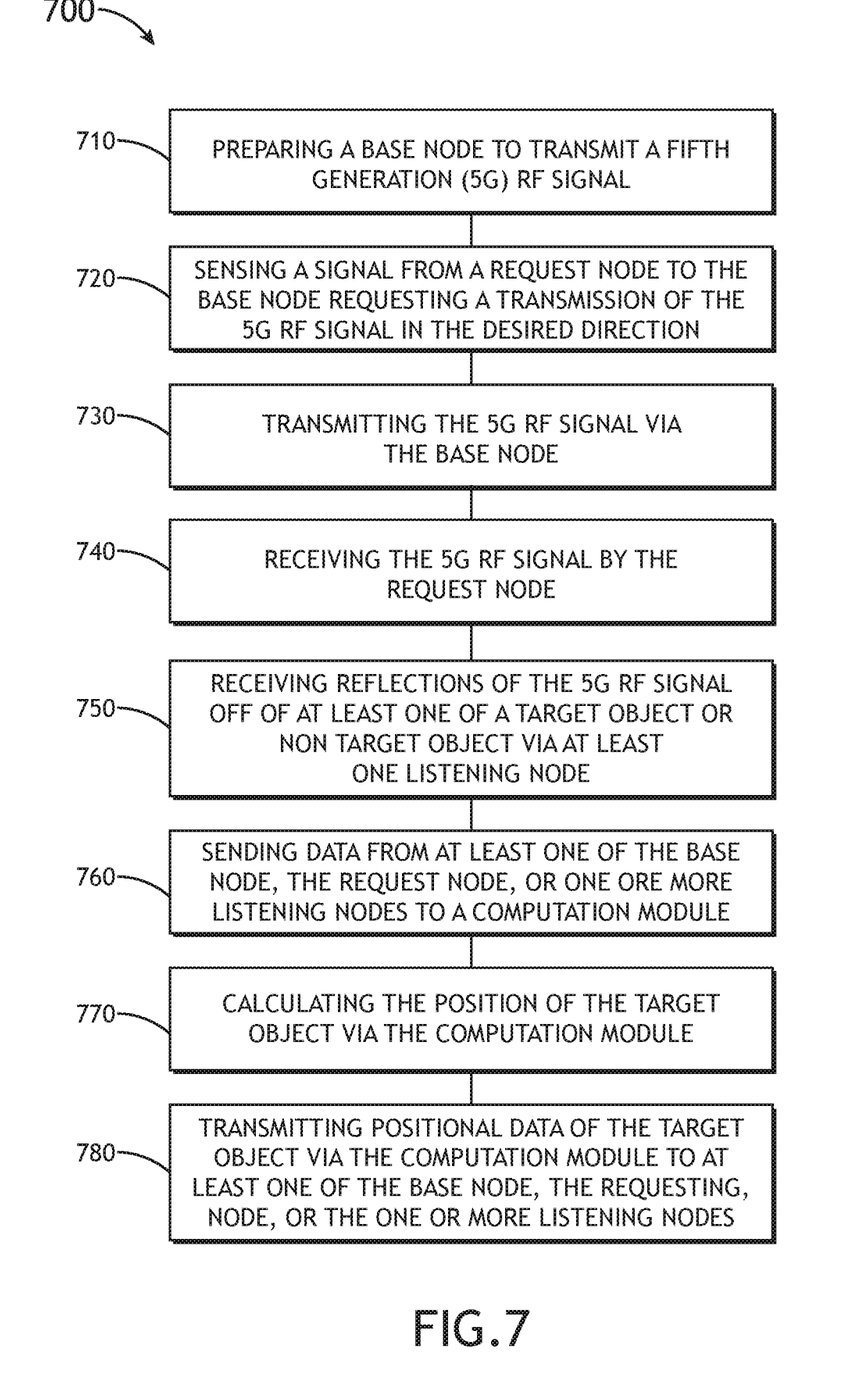
FIG. 7 is a flow diagram illustrating the method for determining the position of a target object in a multi node radar network system, in accordance with one or embodiments of the present disclosure.

A method for determining the position of a target object in a multi node radar network system is disclosed. FIG. 7 is a flow diagram illustrating the method 700 for determining the position of a target object in a multi node radar network system 100, in accordance with one or embodiments of the present disclosure. In some embodiments, the method 700 includes the step 710 of preparing a base node 104 to transmit a 5G signal 108. For example, the controller of the base node 104 may need to run software stored in memory for calibrating the transmitter.

In some embodiments, the method 700 includes the step 720 of sending a signal from a request node 120 to the base node 104 requesting a transmission of the 5G RF signal 108 in the desired direction. In some embodiments, the request from the request node 120 may be an agreed upon signal (e.g., by the multi node radar network system 100) to transmit a 5G RF signal 108. For example, the request may take the form of a high data request. In another example, the request may take the form of a 'codeword' signal. In some embodiments, the request from the request node may be an instructional communication. For example, the request node 120 may send a signal to the base node 104 specifically instructing the base node 104 to transmit a 5G RF signal 108 to the request node 120. In some embodiments, the request node 120 controls the beam direction of the 5G RF signal 108 of the base node 120 using 5G communication data requests from other nodes.

It should be known that, with the exception of the 5G RF signal 108 transmitted by the base node 104 used for target object 112 localization, any type of communication signal may be used between nodes in the multi node radar network system 100 including but not limited to radio signals, Wi-Fi signals, Bluetooth signals, 3G signals, 4G signals, 4G LTE signals, 5G signals, and the like. For example, all nodes within the multi node radar network system may be capable of communication using 5G protocols, with latency periods of less than one msec. Those skilled in the art will recognize that a wide variety of transmitting and receiving devices may be used without departing from the spirit and scope of the present disclosure.

In some embodiments, the method 700 includes the step 730 of transmitting the 5G RF signal via the base node. In some embodiments, the base node 104 sends the 5G RF signal 108 directly towards the request node 120. In some embodiments, the base node 104 sends the 5G RF signal 108 to coordinates specified by the request node. For example, the request node 120 may request the base node 104 to send the 5G RF signal 108 directly to the request node 120. In another embodiment, the request node may request the that a listening mode act as a request node. For instance, if the request node 120 perceives that the target object 112 is moving away from alignment with the base node 104 and the target object 112, the request node 120 may request that a listening node 124 in the proper location act as a request node 120. The newly designated request node 120 would then request, and receive, a 5G RF signal 108 transmitted from the base node 104.

It should be known that the 5G RF signal 108 sent by the base node 104 for location purposes should be powerful enough that the reflection of a portion of the 5G RF signal 108 off of a target object or non-target object may be received by other node and used to calculate a position of the target object or non-target object. For example, the 5G RF signal 108 may have a power of +75 dBm. In another example, the 5G RF signal 108 may have a power less than +75 dBm. For instance, the 5G RF signal 108 may have a power in a range of +15 dBm to +74 dBm. In another example, the 5G RF signal 108 may be greater than +75 dBm. For instance, the 5G RF signal may have a power in a range of +76 dBm to +100 dBm. Many ranges of power of the 5G RF signal 108 are possible, therefore the above description should not be interpreted as a limitation of the present disclosure, but merely an illustration.

In some embodiments, the method includes step 740 of receiving the 5G RF signal by the request node. By receiving at least a portion of the 5G RF signal from the base node 104, the request node 120 can determine and report the distance of the request node 120 from the base node 104, which is utilized with reflection data from the listening node 124 to determine the location or velocity of the object. In some embodiments, the base node 104, the request node 120 and the one or more listening nodes 124 are time-synchronized with each other.

In some embodiments, the method 700 includes the step 750 of receiving reflections of the 5G RF signal off of at least one of a target object 112 or nontarget object 116 via at least one or more listening nodes 124. As described herein, an object in the path of the 5G RF signal 108 transmitted by the base node 104 will reflect off of the surface of the target object 112 or nontarget object 116. If these reflected signals are received by one or more listening node 124 the data, along with data from the request node 120, may be used to determine the location of the target object 112 or nontarget object 116.

In some embodiments, the method 700 includes the step 760 of sending data from a least one of the base node 104, request node 120, and listening node 124 to a computation module 228 and the step 770 of calculating the position of the target object 112 via the computation module 228. In some embodiments, the computation module 228 includes a non-transitory computer-readable storage medium encoded with processor-executable instructions on one or more nodes in the multi node radar network system 100. For example, the computation module may be a stand-alone program on the request node 120 (e.g., an 'app' on a cell phone), which calculates and reports the position of the target object 112 after receiving data from the one or more listening nodes 124 and incorporating signal reception data from the request node 120. In another example, the base node 104 may receive signal data from both the request node 120 and the one or more listening nodes 124, and perform the calculations for target object 112 location using the computation module 228 (e.g., an app accessible by the listening node). In still another example, the computation module 228 may exist as a software program shared by every node, with signal data also shared by each node. As mentioned herein, the computation module 228 may also exist partially or in toto as an isolated server (e.g., a server used in cloud computing), wherein data from each node is also uploaded to computation module 228 located on the isolated server.

In some embodiments, the method 700 includes the step 780 of transmitting positional data of the target object 112 via the computation module 228 to at least one of the base node 104, the requesting node 120, or the one or more listening node 124. Whether the computation module 228 is located on an isolated server or on a node, data relating to the location of the target object will be transmitted to one or more nodes within the multi node radar network system 100. For example, location data of the object data may be sent to the request node 120 to help the request node 120 in deciding whether to request another 5G RF signal from the base node 104. In another example, the base node 104 may receive location data that no target object 112 was detected, resulting in the base node 104 deciding to not respond to an immediate and/or subsequent request from the request node 120.

In some embodiments, the positional data of at least one of the base node 104, the request node 120, or the one or more listening nodes 124 are reported to the computation module 228. The computation module 228 requires positional information from at least one of the nodes in order to calculate the position of the target object 112. In some embodiments, the position of at least one of the base node 104, the request node 120, or the one or more node are determined by at least one of a global positioning method, or by sending and receiving signals between one or more nodes. The use of the Global Positioning System (GPS) to establish the position of a transmitting node (e.g., a cell phone) is well established. However, obstacles (e.g., mountains or buildings) or adversarial action (e.g., jamming signals) may make geo-location of the nodes difficult. Methods for radio direction finding (RDF) and distance measurements can be used by each node (e.g., using an app) to find relative locations of a node within the multi node radar network system 100 without relying on GPS methods.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A multi node radar network system, comprising:
   a first base node comprising:
     a first receiver configured to receive one or ore communications from the multi node radar network;
     a first transmitter configured to transmit a first directional $5^{th}$ generation (5G) radio frequency (RF) signal; and
     a controller being in communication with the mufti node radar network, the controller configured to:
       receive the one or more communications from the first receiver;
       command the transmitter to transmit the first directional 5G RF signal based on the one or more communications from the first receiver; and
       command the first transmitter to steer the first directional 5G RF signal based on the one or more communications from the first receiver;
   a request node, further comprising:
     a second transmitter configured to:
       transmit to the first base node a first request to transmit the first directional 5G RF signal;
       transmit to the first base node a second request to steer the first directional 5G RF signal in a requested direction, and transmit data to one or more nodes within the multi node radar network system; and
     a second receiver configured to:
     receive the first directional 5G RF signal from the first base node; and
     receive data from one or more nodes within the multi node radar network system;
   two or more listening nodes, further comprising:
     a third receiver configured to:

receive a reflection of the first directional 5G RF signal off of at least one of a target object or nontarget object; and receive data from the one or more nodes within the multi node radar network system;

a third transmitter configured to send data to the one or more nodes within the multi node radar network system wherein the first base node is synchronized with the request node and at the two or more listening node; and a second base node configured to transmit a second directional 5G RF signal if no reflection of the first 5G RF signal is detected;

a computation module, configured to:

receive data from at least one of the first base node, the request node, or the one or more listening nodes; and determine if the third receiver has received the reflection, wherein upon a determination of the third receiver receiving the reflection, the computational module is further configured to calculate a position of the target object and report the position of the target object to least one of the first base node, the request node, or the one or more listening nodes, wherein upon a determination of the third receiver not receiving the reflection, the computational module is further configured to send a message to the second base station to transmit the second directional 5G RF signal.

2. The multi node radar network system of claim 1, wherein the first base node further comprises a consumer wireless base station.

3. The multi node radar network system of claim 1, wherein at least one of the first base node, the request node or the one or more listening nodes further comprises a mobile electronic device.

4. The multi node radar network system of claim 1, wherein the computation module further comprises a non-transitory computer-readable storage medium encoded with processor-executable instructions.

5. The multi node radar network system of claim 1, wherein the computation module is configured as a remote server.

6. The multi node radar network system of claim 1, wherein a position of at least one of the first base node, the requesting node or the one or more listening nodes are determined by at least one of a global positioning method, or by sending and receiving signals between the one or more nodes.

7. A method for determining a position of a target object in a multi node radar network system, comprising:

preparing a base node to transmit a first $5^{th}$ generation (5G) radio frequency (RF) signal;

sending a signal from a request node to the first base node requesting a transmission of the first 5G RF signal in a desired direction;

transmitting the first 5G RF signal via the first base node;

receiving the first 5G RF signal by the requesting node;

receiving reflections of the first 5G RF signal off of at least one of a target object or nontarget object via at least one or more listening nodes;

sending data from at least one of the first base node the requesting node, or one or more listening nodes to a computation module;

calculating a position of the target object via the computation module;

transmitting positional data of the target object via the computation module to at least one of the first base node, the requesting node, or the one or more listening nodes; and sending a message to a second base station to transmit a second directional 5G RF signal if no reflections of the first 5G RF signal off of the target object are detected.

8. The method of claim 7, wherein the first base node further comprises a consumer wireless base station.

9. The method of claim 7, wherein at least one of the first base node, the request node or the one or more listening nodes further comprises a mobile electronic device.

10. The method of claim 7, wherein the request node controls a beam direction of the first 5G RG signal of the first base node using a 5G communication data request.

11. The method of claim 7, wherein the computation module is configured as a remote server.

12. The method of claim 7, wherein positional data of at least one of the first base node, the request node or the one or more listening nodes are reported to the computation module.

13. The method of claim 7, wherein a position of at least one of the first base node base node, the request node or the one or more listening nodes are determined by at least one of a global positioning method, or by sending and receiving signals between one or more nodes.

* * * * *